(12) United States Patent
Bertrand et al.

(10) Patent No.: US 10,710,352 B2
(45) Date of Patent: Jul. 14, 2020

(54) STRUCTURAL PRE-CURED REPAIR PATCH FOR REPAIR TO HIGHLY LOADED PRIMARY AND SECONDARY STRUCTURAL COMPONENTS

(71) Applicant: The Boeing Company, Chicago, IL (US)

(72) Inventors: Blake A. Bertrand, Port Orchard, WA (US); Arne K. Lewis, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 282 days.

(21) Appl. No.: 15/646,606

(22) Filed: Jul. 11, 2017

(65) Prior Publication Data
US 2019/0016107 A1    Jan. 17, 2019

(51) Int. Cl.
*B29C 73/10*    (2006.01)
*B29C 65/48*    (2006.01)
(Continued)

(52) U.S. Cl.
CPC .............. *B32B 43/00* (2013.01); *B29C 73/10* (2013.01); *B32B 7/12* (2013.01); *B32B 37/12* (2013.01)

(58) Field of Classification Search
CPC ....... B29C 65/00; B29C 65/48; B29C 65/483; B29C 65/4835; B29C 65/486; B29C 66/00; B29C 66/70; B29C 66/721; B29C 66/7212; B29C 66/723; B29C 66/7394; B29C 66/73941; B29C 73/10; B29C 73/12; B29C 73/24; B29C 73/30; B29C 73/34;
(Continued)

(56) References Cited

U.S. PATENT DOCUMENTS 5,882,756 A    3/1999    Alston et al.
8,468,709 B2    6/2013    Akdeniz et al.
(Continued)

OTHER PUBLICATIONS

Extended European Search Report dated Nov. 21, 2018 from corresponding European Application No. 18170982.5 (8 pages).
(Continued)

*Primary Examiner* — Philip C Tucker
*Assistant Examiner* — Brian R Slawski
(74) *Attorney, Agent, or Firm* — MH2 Technology Law Group LLP (57) ABSTRACT

Provided is a method a method for reworking an article. The method includes forming a patch over an area of a composite structure requiring rework. The forming includes placing a first film-adhesive over the area of the composite structure requiring rework, wherein the first film-adhesive extends over a first surface area of the structure including beyond an entirety of the area requiring rework, placing a first pre-cured ply stack over the first film-adhesive, wherein the first pre-cured ply stack extends over a second surface area of the composite structure; placing a second film-adhesive over the first pre-cured ply stack, wherein the second film-adhesive extends over a third surface area of the composite structure; and placing a second pre-cured ply stack over the second film-adhesive, wherein the second pre-cured ply stack extends over a fourth surface area of the composite structure.

15 Claims, 7 Drawing Sheets

(51) Int. Cl.
*B29C 65/00* (2006.01)
*B32B 37/12* (2006.01)
*B32B 37/00* (2006.01)
*B32B 43/00* (2006.01)
*B32B 7/12* (2006.01)

(58) Field of Classification Search
CPC ............. Y10T 428/10; Y10T 29/49732; B29L 2031/3076; B29L 2031/3082; B64F 5/40; B32B 43/00; B32B 7/12; B32B 37/12; B32B 37/1207; B32B 37/1253; B32B 27/00; B32B 27/04; B32B 27/06; B32B 27/08; B32B 2605/18
USPC ....... 156/60, 64, 94, 98, 153, 182, 247, 249, 156/289, 307.1, 307.3; 428/63, 64.1, 113
See application file for complete search history.

(56) References Cited

U.S. PATENT DOCUMENTS

| | | |
|---|---|---|
| 8,828,515 B2 | 9/2014 | Dan-Jumbo et al. |
| 9,492,975 B2 | 11/2016 | Dan-Jumbo |
| 2014/0295124 A1* | 10/2014 | Suhara .................... B29C 73/10 428/63 |
| 2014/0326389 A1* | 11/2014 | Blanchard ........... B29C 65/4875 156/64 |
| 2015/0090392 A1* | 4/2015 | Bertrand ................ B32B 43/00 156/64 |

OTHER PUBLICATIONS

Examination Report dated May 14, 2020 in corresponding GCC Application No. GC 2018-35576 (5 pages with including English translation).

* cited by examiner

STRUCTURAL PRE-CURED REPAIR PATCH FOR REPAIR TO HIGHLY LOADED PRIMARY AND SECONDARY STRUCTURAL COMPONENTS

TECHNICAL FIELD

The present disclosure relates generally to repairing highly loaded primary and secondary structural components and, more particularly, to a patch for installation in a rework area of a composite structure.

BACKGROUND

Composite materials are typically made from two or more constituent materials with significantly different physical or chemical properties. Typically, the constituent materials include a matrix (or bond) material, such as resin, and a reinforcement material, such as a network of fibers. When combined, the constituent materials typically produce a composite material with characteristics different from the individual constituent materials, even though the constituent materials generally remain separate and distinct within the finished structure of the composite material. For example, composite materials may be stronger and/or lighter than traditional materials. Carbon-fiber-reinforced polymer is an example of such a composite material.

Composite structures—those made fully or partially from composites—are used in a wide variety of applications in aircraft construction to form highly loaded primary and secondary structural components including the fuselage, wings, and other components of the aircraft. For example, the wings and wing components of an aircraft, such as flaps, may be constructed of composite skin members. Generally, such composite items are built up, layer upon layer on a mold, or the fiber component is placed and then impregnated with resin.

While composites are quite strong, they are generally not as tough as metals' and are, therefore, susceptible to damage or deformation during assembly, during servicing, or during operation. Repair of such components may require several steps, including taper sanding which is time consuming. Accordingly, improved structures, methods and kits for repairing composite structures would be a welcome addition to the art.

SUMMARY

In an example, there is a method for reworking an article. The method comprises forming a patch over an area of a composite structure requiring rework. The forming comprising placing a first film-adhesive over the area of the composite structure requiring rework, wherein the first film-adhesive extends over a first surface area of the composite structure including beyond an entirety of the area requiring rework, placing a first pre-cured ply stack over the first film-adhesive, wherein the first pre-cured ply stack extends over a second surface area of the composite structure; placing a second film-adhesive over the first pre-cured ply stack, wherein the second film-adhesive extends over a third surface area of the composite structure; and placing a second pre-cured ply stack over the second film-adhesive, wherein the second pre-cured ply stack extends over a fourth surface area of the composite structure.

In another example, there is a method for reworking an article. The repair method comprises forming a patch over an area of a structure requiring rework, wherein the patch comprises a stiffness substantially equal to a predetermined stiffness. Forming of the patch comprises alternating between placing at least one film-adhesive and placing at least one pre-cured ply stack over the area of the composite structure requiring rework, wherein the at least one film-adhesive extends over a first surface area of the composite structure and the at least one pre-cured ply stack extends over a second surface area of the composite structure that is different than the first surface area. The method further comprises bonding the at least one film-adhesive to a surface of the composite structure.

In yet another example, there is a repair patch kit for repairing a composite material. The repair patch kit comprises a first film-adhesive defined by a first shape and having a first size; a first pre-cured ply stack having a second size; a second film-adhesive sized differently than the first film-adhesive; and a second pre-cured ply stack sized differently than the first pre-cured ply stack.

Advantages of the examples will be set forth in part in the description which follows, and in part will be understood from the description, or may be learned by practice of the examples. The advantages will be realized and attained by means of the elements and combinations particularly pointed out in the appended claims.

It is to be understood that both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this specification, illustrate examples of the present teachings and together with the description, serve to explain the principles of the disclosure.

DESCRIPTION OF THE EXAMPLES

Reference will now be made in detail to the present examples, examples of which are illustrated in the accompanying drawings. Wherever possible, the same reference numbers will be used throughout the drawings to refer to the same or like parts.

Notwithstanding that the numerical ranges and parameters setting forth the broad scope of the examples are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter may take on negative values. In this case, the example value of range stated as "less than 10" may assume negative values, e.g. −1, −2, −3, −10, −20, −30, etc.

The following examples are described for illustrative purposes only with reference to the Figures. Those of skill in the art will appreciate that the following description is exemplary in nature, and that various modifications to the parameters set forth herein could be made without departing from the scope of the present examples. It is intended that the specification and examples be considered as exemplary only. The various examples are not necessarily mutually exclusive, as some examples may be combined with one or more other examples to form new examples. It will be understood that the structures depicted in the figures may include additional features not depicted for simplicity, while depicted structures may be removed or modified.

As described herein, a composite structure may be assembled into a structural component for use in a larger structure such as a land-based vehicle, an aircraft, a space vehicle, or a waterborne vehicle. By way of example, aircraft structures such as wings and tails commonly include structural components formed from composite materials that may require rework. Thus, examples described herein allow for, among other things, the reworking of composite structures.

Figure 1A:
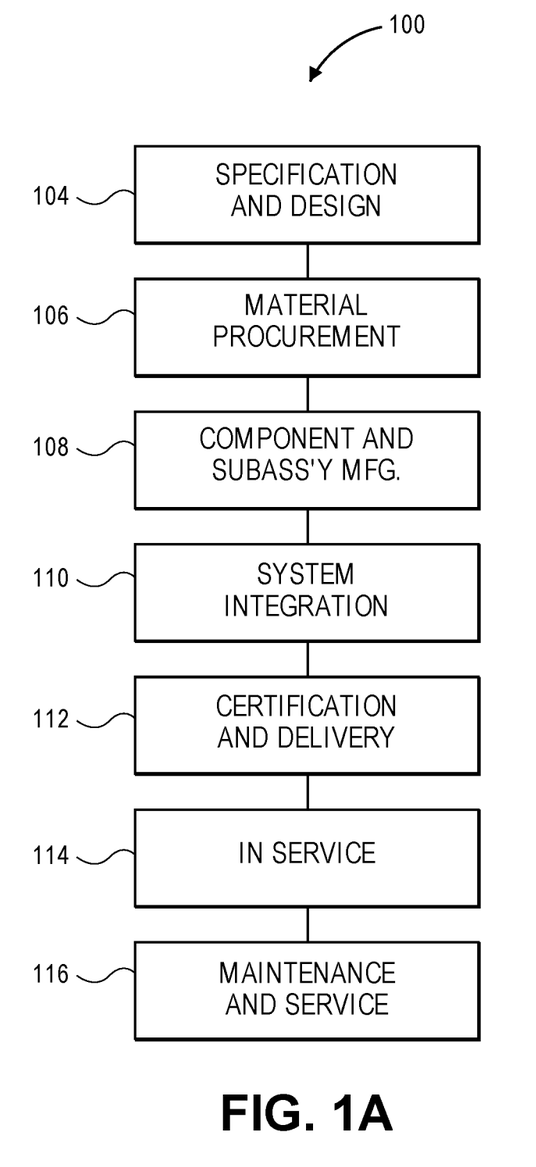
FIG. 1A is a flow diagram of aircraft production and service methodology, according to an example.
Figure 1B:
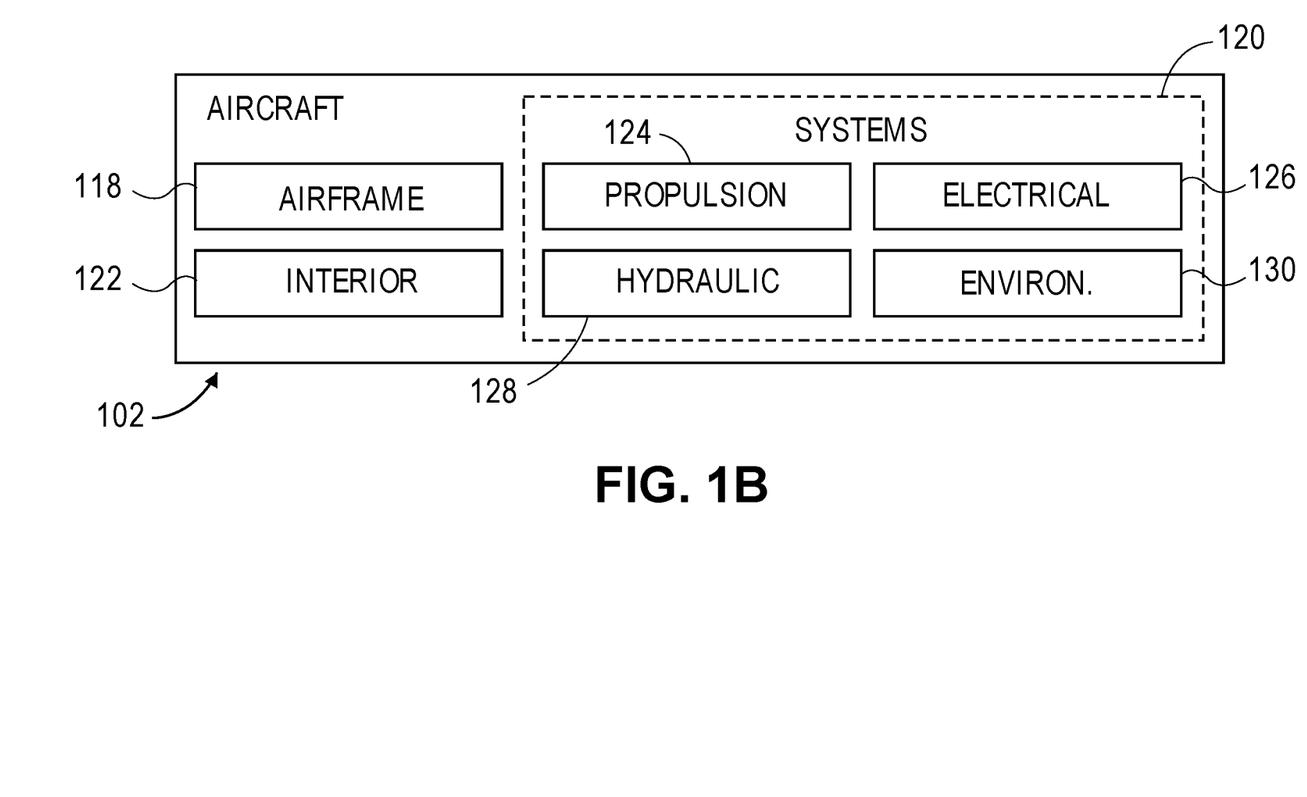
FIG. 1B is a block diagram of an aircraft, according to an example.

Referring more particularly to the drawings, examples of the disclosure may be described in the context of an aircraft manufacturing and service method 100 as shown in FIG. 1A and an aircraft 102 as shown in FIG. 1B. Turning to FIG. 1A, during pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 may be scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 1B, the aircraft 102 which may be manufactured and serviced according to exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Figure 2:
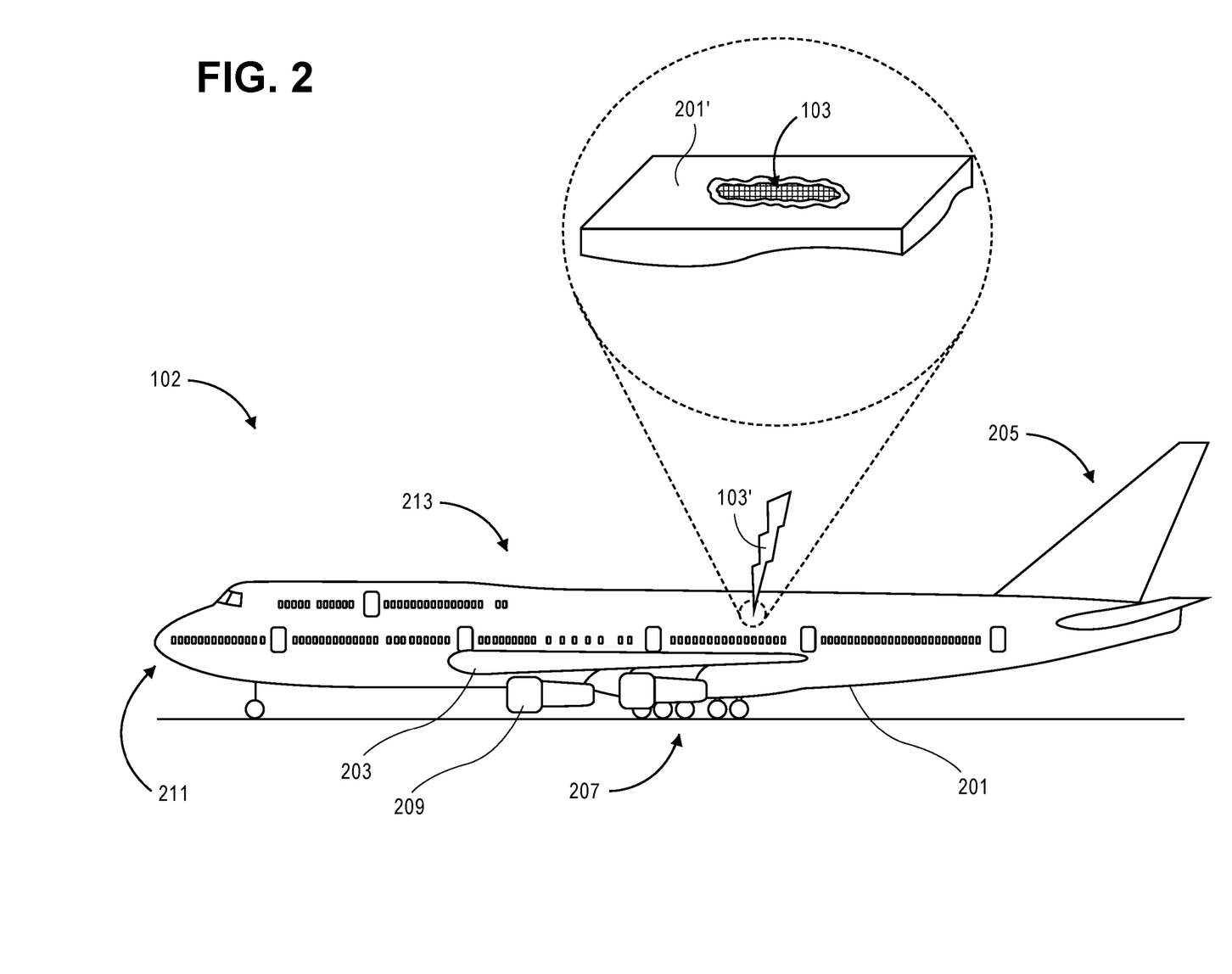
FIG. 2 is a schematic illustration of an aircraft that includes a composite structure requiring rework.

FIG. 2 is a side elevation view of an aircraft 102 comprising one or more composite structures in accordance with another example of the disclosure. One of ordinary skill in the art will appreciate that composite structures may be employed in a wide variety of highly loaded primary and secondary structural components (e.g., moderately loaded secondary structural components), including the fuselage, wings, empennage, body, and walls of the aircraft 102. In alternate examples, composite parts may be used on other types of structures, vehicles, and platforms, such as motor vehicles, aircraft, maritime vessels, or spacecraft, or other suitable applications.

In this example, the aircraft 102 includes a fuselage 201 including wing assemblies 203, a tail assembly 205, and a landing assembly 207. The aircraft 102 further includes one or more propulsion units 209, a control system 211 (not visible), and a host of other systems and subsystems, such as those described above as high-level systems, that enable proper operation of the aircraft 102. In general, the various components and subsystems of the aircraft 102 may be of known construction and, for the sake of brevity, will not be described in detail herein.

Although the aircraft 102 shown in FIG. 2 is generally representative of a commercial passenger aircraft, including, for example, the 737, 747, 757, 767, 777, and 787 models commercially available from The Boeing Company of Chicago, Ill., the inventive composite article and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned air vehicle.

As used herein, "rework", "reworked" and "reworking" are used in their broadest sense and are intended to include, without limitation, assembly, repair, restoration, replacement, improvements and modifications, both factory processes and in-service applications for addressing structural inconsistencies and structural improvements that may either return a structure to its original loading carrying ability and/or specifications, or improve or increase the performance of the structure in one or more respects. For example, in the case of a composite structure incorporated on an aircraft, an area of the composite structure requiring rework may include a fault that requires repair in order for aircraft to be safely operated. In some situations, such as when the aircraft is required to remain in service and it is important to avoid schedule interruptions, it may be necessary to perform the rework "in the field" outside of a hangar environment where specialized equipment, special handling and/or skilled maintenance technicians are available. For example, it may be necessary to perform the necessary rework within a limited time while the airplane is parked at an airport gate in order to avoid a schedule delay. In accordance with the disclosed examples, the needed rework may be performed relatively quickly by workers such as line mechanics who may have limited knowledge of composite materials.

As shown in FIG. 2, a highly loaded primary or secondary structural component of aircraft, such as a composite structure 201', including a surface and/or subsurface portion of such a structural component (e.g., a skin panel), may have a fault such that the component requires rework. Although not limited to any particular cause, a fault may include localized area in, for example, a composite structure that may be outside of designed tolerances. Such faults may be caused, without limitation, by physical strike, gradual wear, material or manufacturing defects on or within the structural component or materials thereof, and external acts of nature such as wind damage or a lightning strike 103'. Accordingly, a fault may be defined by an area 103 requiring rework which may extend across a surface of the corresponding structure (such as a deformation or dent), or through the structure (such as a tear or puncture). In other words, the fault requiring rework may extend from an outer surface of the composite structure 201', for example, a skin panel, and penetrate through one or more plies of composite structure 201', for example, one or more composite plies of the skin panel. Accordingly, the area 103 requiring rework may extend partially through the composite structure from a first surface to an interior portion of the composite structure, or completely through the composite structure from a first surface to an opposing surface of the composite structure 201'. However, what constitutes a fault is not so limited and the fault may be any type of deformation on or in the composite structure 201' that extends down into one or more of the plies of the composite structure 201' but which does not penetrate the composite structure's plies. The composite structure requiring rework may be modified by the forming a patch thereover in accordance with at least one example of this disclosure.

Generally, a method for reworking at least a portion of an article, such as a composite structure of an article, includes forming a patch over an area of the structure requiring rework. In an example, the patch may be formed by alternating between placing of at least one film-adhesive and the placing of at least one pre-cured ply stack, for example, one over the other, over an area of a surface requiring rework, such as a surface of a composite structure. In an example, the at least one film-adhesive comprises a plurality of film-adhesives disposed as individual layers or integrated layers of the patch. In an example, the at least one pre-cured ply stack comprises a plurality of pre-cured ply stacks disposed as individual layers or as integrated layers of the patch.

A curing step may be performed after the placing of the at least one film-adhesive, such as between the placing of the at least one film-adhesive and the placing of the at least one pre-cured ply stack. A curing step may be performed after the placing of the at least one pre-cured ply stack, such as between the placing of the at least one pre-cured ply stack and the placing of the at least one film-adhesive. A curing step may be performed both after placing the film-adhesive and after the placing of the pre-cured ply stack. The curing may be performed so as to at least partially to fully cure the at least one film-adhesive, so as to at least further to fully cure the pre-cured ply stack, or both.

The alternating between the placing of one or more additional ones of a film-adhesive and the placing of the one or more additional ones of a pre-cured ply stack, for example, one over the other, may be continued with or without the curing step to form a patch over the composite structure surface. The alternating may be performed any number of times, including one time, two times, three times and up to n times, where n is an integer. The alternating may end with the placing of a film-adhesive as the $n^{th}$ layer of the patch or may end with the placing of a pre-cured ply stack as the $n^{th}$ layer of the patch.

In an implementation, a configuration of a patch formed according to such a method comprises: a first film-adhesive which may be formed over the surface of a structure, and a first pre-cured ply stack formed over the first film-adhesive.

In an implementation, a configuration of a patch formed according to such a method comprises: a first film-adhesive which may be formed over the surface of a structure, a first pre-cured ply stack disposed over the first film-adhesive, a second film-adhesive disposed over the first pre-cured ply stack, and a second pre-cured ply stack disposed over the second film-adhesive.

In an implementation, a configuration of a patch formed according to such a method comprises: a first film-adhesive which may be formed over the surface of a structure, a first pre-cured ply stack disposed over the first film-adhesive, a second film-adhesive disposed over the first pre-cured ply stack, and a second pre-cured ply stack disposed over the second film-adhesive . . . an (n–1) film-adhesive disposed over an $(n-2)^{th}$ pre-cured ply stack, an $(n-1)^{th}$ pre-cured ply stack disposed over the $(n-1)^{th}$ film-adhesive, an $n^{th}$ film-adhesive disposed over the $(n-1)^{th}$ pre-cured ply stack, and an $n^{th}$ pre-cured ply stack disposed over the $n^{th}$ film-adhesive.

The alternating may be performed until a patch having a pre-determined stiffness, for example, a stiffness within designed tolerances of the particular structure requiring rework, is formed. For example, the alternating may be performed until a patch comprising a stiffness within designed tolerances of a surface of a composite structure, and/or at least one ply of a composite structure is formed.

In an example of a patch as described herein, a first one of the at least one film-adhesive (i.e., a first film-adhesive) may extend over the area of the structure requiring rework. The first one of the at least one film-adhesive may extend completely over the area of the structure requiring rework. The first one of the at least one film-adhesive may extend completely over and beyond the area of the structure requiring rework, for example, so as to extend over a surface portion of the structure, such as a surface portion of the structure that does not require rework (e.g., a portion of the surface of the structure not included in the area requiring rework which may have a quality within a designed tolerance). In other words, the first one of the at least one film-adhesive may extend over a first surface area of the structure over which it is disposed, including the surface area of the area requiring the rework.

In an example of a patch as described herein, a first one of the at least one pre-cured ply stack (i.e., a first pre-cured ply stack) may extend over the area of the structure requiring rework. The first one of the at least one pre-cured ply stack may extend completely over the area of the structure requiring rework. The first one of the at least one pre-cured ply stack may extend completely over and beyond the area of the structure requiring rework, for example, so as to extend over a surface portion of the structure, such as a surface portion of the structure that does not require rework as described above. In other words, the first one of the at least one pre-cured ply stack may extend over a second surface area of the structure over which it is disposed, which may or may not include over the surface area of the area requiring the rework. In an example, the first surface area and the second surface area are substantially the same. In an example, the first surface area and the second surface area are different. That is, the first surface area may be larger than the second surface area or the first surface area may be smaller than the second surface area.

In an example of a patch as described herein, the at least one film-adhesive comprises a plurality of film-adhesives. The plurality of film-adhesives may include integrated or separate ones of the at least one film-adhesive, for example, a first one of the at least one film-adhesive (i.e., a first film-adhesive) and a second one of the at least one film-adhesive (i.e., a second film-adhesive). The second one of the at least one film-adhesive may extend over the area of the structure requiring rework. The second one of the at least one film-adhesive may extend completely over the area of the structure requiring rework. The second one of the at least one film-adhesive may extend completely over and beyond the area of the structure requiring rework, for example, so as to extend over a surface portion of the structure, such as a surface portion of the structure that does not require rework as described above. In other words, the second one of the at least one film-adhesive may extend over a third surface area of the structure over which it is disposed, including the surface area of the area requiring the rework. In an example, the first surface area and the third surface are substantially the same or are different. That is, the first surface area may be larger than the third surface area or the first surface area may be smaller than the third surface area. In an example, the second surface area and the third surface area are substantially the same or are different. That is, the second surface area may be larger than the third surface area or the second surface area may be smaller than the third surface area.

In an example of a patch as described herein, the at least one pre-cured ply stack comprises a plurality of pre-cured ply stacks. The plurality of pre-cured ply stacks may include integrated or separate ones of the at least one pre-cured ply stack, for example, a first one of the at least pre-cured ply stack (i.e., a first pre-cured ply stack) and a second one of the at least one pre-cured ply stack (i.e., a second pre-cured ply stack). The second one of the at least one pre-cured ply stack may extend over the area of the structure requiring rework. The second one of the at least one pre-cured ply stack may extend completely over the area of the structure requiring rework. The second one of the at least one pre-cured ply stack may extend completely over and beyond the area of the structure requiring rework, for example, so as to extend over a surface portion of the structure, such as a surface portion of the structure that does not require rework as described above. In other words, the second one of the at least one pre-cured ply stack may extend over a fourth surface area of the structure over which it is disposed, including the surface area of the area requiring the rework. In an example, the first surface area and the fourth surface are substantially the same or are different. That is, the first surface area may be larger than the fourth surface area or the first surface area may be smaller than the fourth surface area. In an example, the second surface area and the fourth surface area are substantially the same or are different. That is, the second surface area may be larger than the fourth surface area or the second surface area may be smaller than the fourth surface area. In an example, the third surface area and the fourth surface area are substantially the same or are different. That is, the third surface area may be larger than the fourth surface area or the third surface area may be smaller than the fourth surface area.

An implementation of at least one of the above descriptions is described in more detail as illustrated in and described below for FIGS. 3A-3E and FIGS. 4A-4E.

Figure 3A:
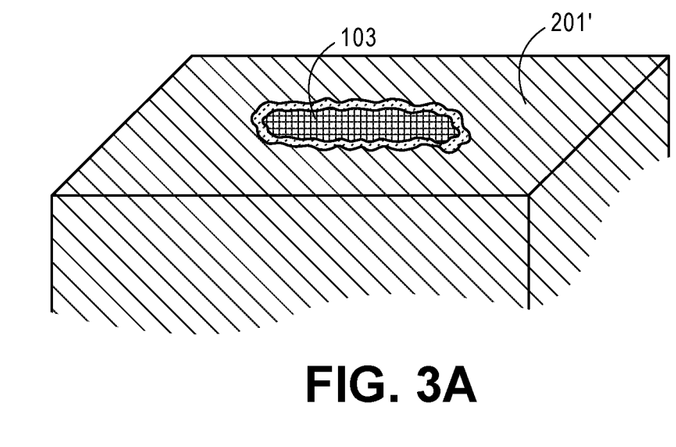
FIGS. 3A-3E illustrate perspective views of a composite structure as it is being reworked according to an implementation of a method described herein.
Figure 3B:
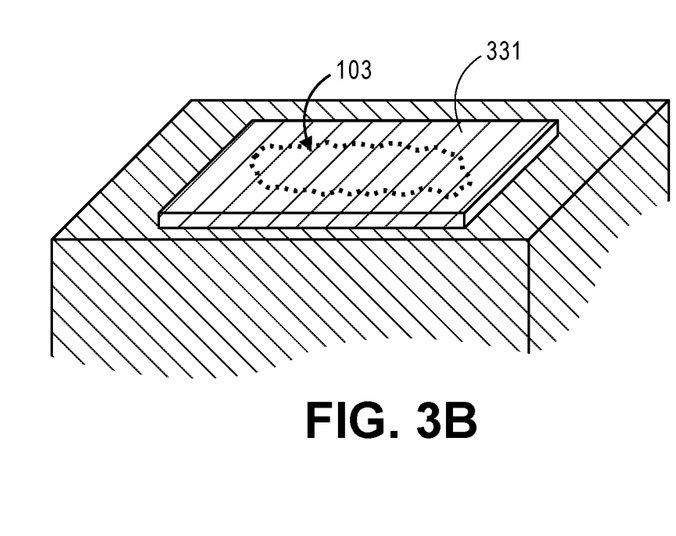
Figure 3C:
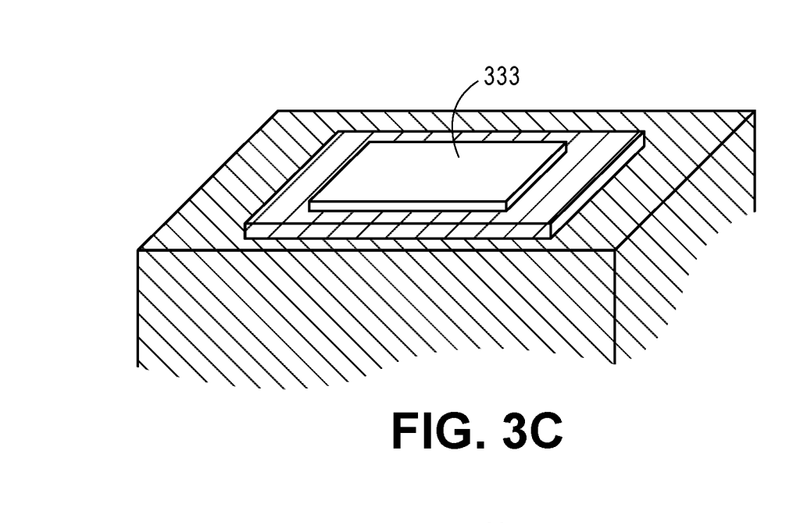
Figure 3D:
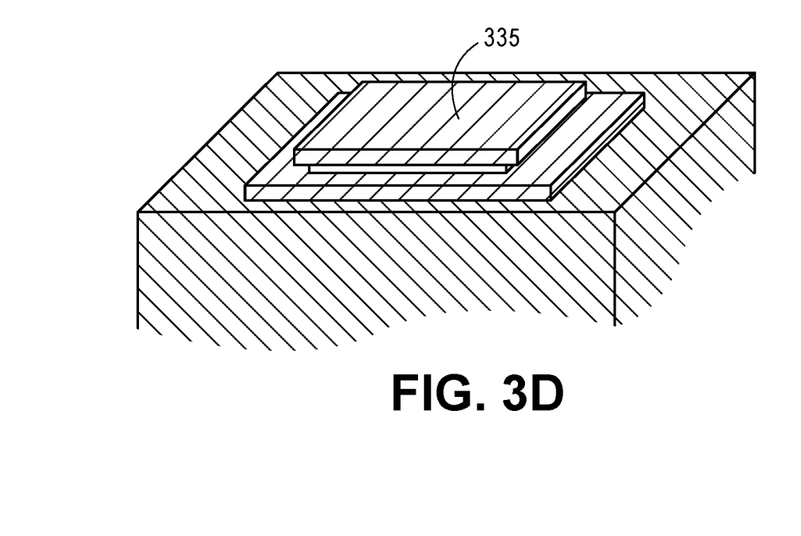
Figure 3E:
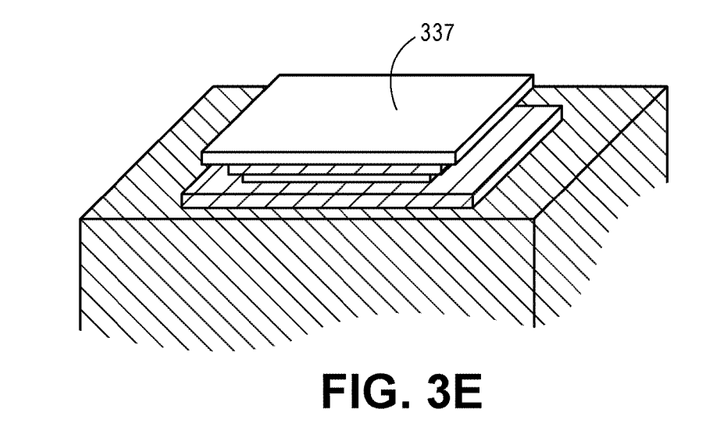
Figure 4A:
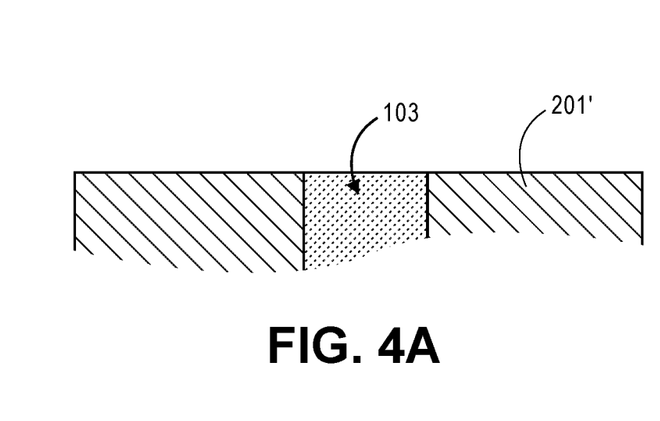
FIGS. 4A-4E illustrate cross-sectional views of the composite structure of FIGS. 3A-3E.
Figure 4B:
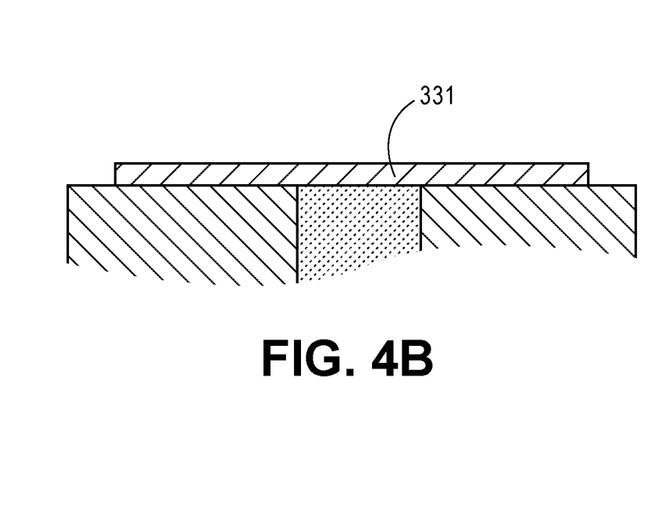

An implementation of a method for reworking an article, such as a composite structure 201', (e.g., a skin panel) of aircraft 102 of FIG. 2, may be understood according to the illustrations shown in FIGS. 3A-3E and FIGS. 4A-4E. The method may include forming a patch, such as patches 500 and/or 500', over area 103 defining, for example, a fault of the composite structure 201' as shown in FIGS. 3A and 4A. The forming of the patch includes placing a first film-adhesive 331 over the area 103 of the composite structure 201' requiring the rework at FIGS. 3B and 4B. Upon the placing of the first film-adhesive, the area 103 may no longer be visible. Thus, the area 103 is represented in FIG. 3B by the dotted lines. The first film-adhesive may extend at least over a first surface area of the composite structure 201'. As shown in FIGS. 3B and 4B, the first film-adhesive extends over a first surface area of the composite structure 201', including extending beyond an entirety of the area 103 requiring rework. The first film-adhesive may extend a distance beyond an edge of the area 103 requiring the rework. In an implementation, the method may further include contacting a surface of the first film-adhesive to the structure's surface.

Figure 4C:
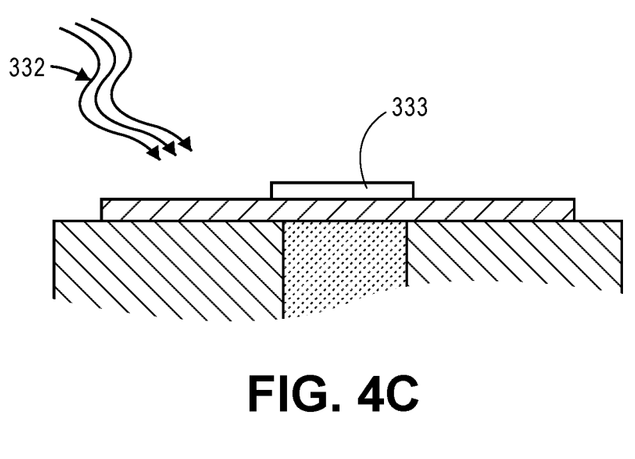

The forming of the patch also includes placing a first pre-cured ply stack 333 over the first film-adhesive at FIGS. 3C and 4C. The first pre-cured ply stack 333 may extend at least over a second surface area of the composite structure. As shown in FIGS. 3C and 4C, the first pre-cured ply stack 333 extends over a second surface area of the composite structure 201', including extending slightly beyond an entirety of the area 103 requiring rework but does not extend as beyond as the first film-adhesive 331. That is, in an implementation, the first surface area is larger than the second surface area. The first pre-cured ply stack 333 may extend a distance beyond an edge of the area 103 requiring the rework.

Figure 4D:
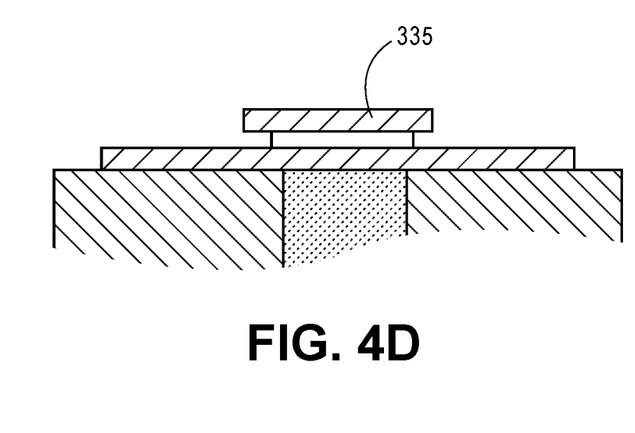

The forming of the patch also includes placing a second film-adhesive 335 over the first pre-cured ply stack at FIGS. 3D and 4D. The second film-adhesive 335 may extend at least over a third surface area of the composite structure. As shown in FIGS. 3D and 4D, the second film-adhesive 335 extends over a third surface area of the composite structure 201', including extending beyond an entirety of the area 103 requiring rework and beyond the first pre-cured ply stack 333. That is, in an implementation, the second surface area is smaller than the third surface area. The second film-adhesive 335 may extend a distance beyond an edge of the area 103 requiring the rework.

Figure 4E:
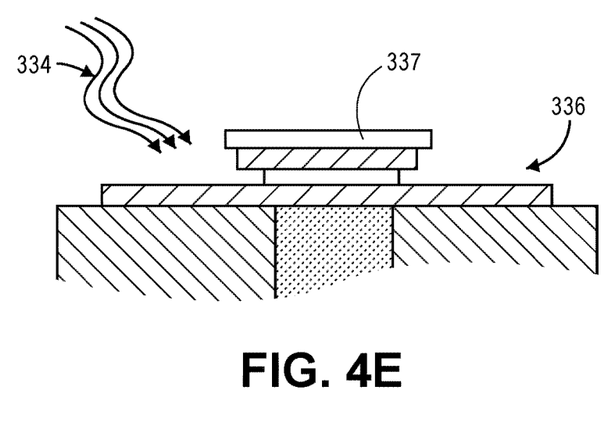

The forming of the patch also includes placing a second pre-cured ply stack 337 over the second film-adhesive at FIGS. 3E and 4E. The second pre-cured ply stack 337 may extend at least over a fourth surface area of the composite structure. As shown in FIGS. 3E and 4E, the second pre-cured ply stack 337 extends over a fourth surface area of the composite structure 201', including extending beyond an entirety of the area 103 requiring rework and beyond the second film-adhesive 335. That is, in an implementation, the second surface area is smaller than the third surface area. The second film-adhesive 335 may extend a distance beyond an edge of the area 103 requiring the rework The method may further include curing the first film-adhesive 331, for example, at FIG. 4C, by exposing it to a first energy source 332. Although the curing of the first film-adhesive is shown in FIG. 4C (i.e., immediately after or during the placing the first pre-cured ply stack 333 over the first film-adhesive 331), the implementations are not so limited and curing of the first film-adhesive may be performed at FIG. 4A (i.e., immediately after or during the placing of the first film-adhesive 331 over the composite structure 201'). The curing of the first film-adhesive 331 bonds the first film-adhesive 331 to the surface portion of the composite structure 201' and/or to the first pre-cured ply stack 333.

The method may further include curing the second film-adhesive 335, for example, by exposing it to a second energy source 334 as shown in FIG. 4E. Although curing of the second film-adhesive is shown at FIG. 4E (i.e., immediately after or during the placing the second pre-cured ply stack 337 over the second film-adhesive 335), the implementations are not so limited and the curing of the second film-adhesive may be performed at FIG. 4D (i.e., immediately after or during the placing of the second film-adhesive 335 over the first pre-cured ply stack 333). The curing of the second film-adhesive 335 bonds the first film-adhesive 335 to the first pre-cured ply stack 333 and/or to the second pre-cured ply stack 337.

While the composite structure 201' in the figures (e.g., a skin panel) is shown as being substantially flat, the composite structure 201' may have a contours or curvatures, in which case one or more layers of a patch applied to the composite structure 201' may conform to the contour or curvature of the composite structure 201'. Also, while the first film-adhesive 331, the first pre-cured ply stack 333, the second film-adhesive 335 and/or the second pre-cured ply stack 337 shown in the figures is/are substantially planar, in other implementations, the first film-adhesive 331, the first pre-cured ply stack 333, the second film-adhesive 335 and/or the second pre-cured ply stack 337 are not so limited and may individually be configured as other shapes, including but not limited to shapes having straight lines, curves, contours, tapers and combinations thereof. The shapes of the first film-adhesive 331, the first pre-cured ply stack 333, the second film-adhesive 335 and/or the second pre-cured ply stack 337 may each individually be the same as one another. The shapes of at least two of first film-adhesive 331, the first pre-cured ply stack 333, the second film-adhesive 335 and the second pre-cured ply stack 337 may be the same (although sizes may be different).

The film-adhesive of the first film-adhesive, the second film-adhesive and/or the additional ones of a plurality film-adhesive, may comprise any suitable film-adhesive composition, for example, as used in the aerospace industry. The adhesive composition may comprise a pre-mixed adhesive composition, for example, a pre-mixed epoxy resin. The pre-mixed epoxy resin may be uncured or partially-cured (i.e., curing process progression of the pre-mixed epoxy resin may be arrested until the film-adhesive is used). Each of the first film-adhesive, the second film-adhesive and/or the additional ones of a plurality film-adhesive may comprise one or more plies of a commercially available structural adhesive which is generally available in film or sheet form that may be cut to the desired shape. The first film-adhesive, the second film-adhesive and/or the additional ones of a film-adhesive may also be formed from a commercially available structural adhesive paste.

In an implementation, the first film-adhesive, the second film-adhesive and/or additional ones of a film-adhesive may independently comprise an adhesive composition, for example, a commercially available adhesive composition. In an implementation, the first film-adhesive and the second film-adhesive may comprise the same adhesive compositions. In an implementation, the first film-adhesive and the second film-adhesive may comprise different adhesive compositions than one another.

The first film-adhesive and/or the second film-adhesive may independently comprise one or more layers of an adhesive composition. The first film-adhesive and/or the second film-adhesive may comprise a continuous layer of an adhesive composition, for example, a commercially available structural adhesive which is generally available in film or sheet form that may be cut to the desired shape or into individual ones of a plurality of film-adhesive. The one or more layers of the first film-adhesive and/or the second film-adhesive may each independently comprise more than one adhesive layers wherein each of the more than one adhesive layers comprise the same adhesive compositions, or at least two of the more than one adhesive layers comprise different adhesive compositions than the other.

The first film-adhesive may comprise a first film shape and the second film-adhesive may comprise a second film shape. The first film shape may be the same as or different than the second film shape. The first film shape and/or the second film shape may comprise a polygon shape (e.g., triangle, square, rectangle . . . n-sided polygon) or a round shape (e.g., oval, circle, and the like). The first film shape and/or the second film shape may be a custom shape based on the area of a structure requiring repair. The first film-adhesive may comprise at least one first dimension and the second film-adhesive may comprise at least one second dimension. For example, the first film-adhesive may comprise a first film thickness in the range of from about 10 mils to about 20 mils. The first film thickness may be the same as or different than the second thickness. Multiple plies of adhesive material may be built up to form a desired thickness for each of the first film-adhesive, the second film-adhesive or both. In some applications only a single ply of adhesive sheet material may be required for the first film-adhesive, the second film-adhesive or both, while in other applications, more than one ply may be necessary, depending on the application and the thickness requirements for reworking a composite structure.

In the case of a polygonal-shaped patch, for example, a square or rectangular patch, the first film-adhesive may comprise a first film width and/or a first film length and the second film-adhesive may comprise a second film width and/or a second film length. The first film length may be the same as or different than the second film length. The first film width may be the same as or different than the second film width. Accordingly, the second film-adhesive may extend an entirety of the first film-adhesive In the case of a round-shaped patch, for example, a circular patch, the first film-adhesive may comprise a first film radius and the second film-adhesive may comprise a second film radius. The first film radius may be the same as or different than the second film radius. Accordingly, the second film-adhesive may extend an entirety of the first film-adhesive and may be formed concentric with the second film-adhesive.

As described above, the curing of the first film-adhesive 331 comprises exposing it to a first energy source 332 and the curing of the second film-adhesive 335 comprises exposing it to a second energy source 334. The first energy source 332 may be the same or different than the second energy source 334. The first energy source 332 and the second energy source 334 may include any type of energy that causes a composition of the film-adhesive to cure. For example, types of energy include thermal energy (i.e., "heat") such as at a curing temperature, electromagnetic energy (i.e., "light") such as at a curing wavelength, or physical energy (i.e., "force") such as a curing pressure. The curing temperature, and/or curing pressure may be a function of the adhesive composition from which the film-adhesives are formed. The first film-adhesive and/or the second film-adhesive may be heated to the same or different temperature(s). In one implementation, each one of the film-adhesive layers may be cured at the same temperature. Curing temperature for curing the film-adhesives of the descriptions may be in the range of about 120° C. to about 126° C., but are not so limited and other curing temperatures may be used depending on the material of the film-adhesive, and/or may be subjected to the same or different pressure(s) in the range of about 20 psi to about 28 psi in order to partially or fully cure.

The first film-adhesive, the second film-adhesive or both may conform to an underlying surface. Thus, the placing of the first film-adhesive, the second film-adhesive, or both may comprise confirming the respective film-adhesive to an underlying surface.

As used herein, the term "pre-cured" in the context of a pre-cured ply stack indicates that at least one matrix material (e.g., a polymer matrix of a composite composition in at least one ply of a ply stack) is at least partially cured. For example, in a pre-cured ply stack in which at least one of the plies comprises a composite composition that includes a polymer matrix and a fiber reinforcement material disposed in the matrix, the polymer matrix is at least partially cured. Additionally, "at least partially cured" may include substantially fully cured.

The first pre-cured ply stack, the second pre-cured ply stack or both may be a purchased pre-cured ply stack or may be formed by providing at least one composite composition and exposing at least a matrix material of the composite composition to energy. For example, types of energy that may be used for at least partially curing the matrix material of the composite composition in order to form a pre-cured ply stack include thermal energy (i.e., "heat") such as at a curing temperature, electromagnetic energy (i.e., "light") such as at a curing wavelength, or physical energy (i.e., "force") such as a curing pressure.

The first pre-cured ply stack, the second pre-cured ply stack or both may be independently available as a laminated sheet comprised of one or more plies, for example, a plurality of plies comprising a pre-cured material. In an example, the pre-cured ply stack may comprise a two-ply book. In other words, the pre-cured ply stack may comprise two plies of at least one pre-cured composite material formed as an integrated sheet. Accordingly, in an example in which a ply stack comprises two or more plies of composite material, to form a pre-cured ply stack a matrix material of each of the two or more plies may be at least partially co-cured and may form a single integrated composite structure.

The first pre-cured ply stack, the second pre-cured ply stack or both may include any suitable material. In an implementation, a composite material of the pre-cured ply stack may be the same or different composite material as that used in at least one ply of the composite structure 201'. In an implementation, the pre-cured composite material of the pre-cured ply stack may include a cured, fiber-reinforced polymer composite such as a carbon fiber reinforced polymer including carbon fiber reinforced plastic (CFRP). In an implementation, the pre-cured composite material may include a cured graphite-epoxy composite material.

Differing orientation sequences of plies in a ply stack may be desirable, for example, in order to aid in achieving a particular stiffness of the patch. Orientation refers to the layup angle or direction of reinforcing fibers in a ply from a central axis of the ply. For example, without limitation, the angles of the reinforcing fibers in at least one ply of the first pre-cured ply stack, the second pre-cured ply stack, or in both the first and second pre-cured ply stacks may be selected from one of 0°, +30°, −30°, 60°, +45°, −45°, +90°, or −90°, and other suitable angles. In an implementation, at least two of the plurality of plies of the first pre-cured ply stack, the second pre-cured ply stack, or both comprise a same ply orientation. In an implementation, at least two of the plurality of plies of the first pre-cured ply stack, the second pre-cured ply stack, or both comprise different ply orientations. In an implementation, a ply orientation of at least one of the plurality of plies of the first pre-cured ply stack is different than a ply orientation of at least one of the plurality of plies of the second pre-cured ply stack. For example, at least one of the plurality of plies of the first pre-cured ply stack may comprise a ply orientation of 0° or 90°, and wherein at least one of the plurality of plies of the second pre-cured ply stack comprises a ply orientation of +45° or −45°.

The first pre-cured ply stack may comprise a first laminated sheet shape and the second pre-cured ply stack may comprise a second laminated sheet shape. The first laminated sheet shape may be the same as or different than the second laminated sheet shape. The first laminated sheet shape and/or the second laminated sheet shape may comprise a polygon shape (e.g., triangle, square, rectangle . . . n-sided polygon) or a round shape (e.g., oval, circle, and the like), or any suitable shape. The first laminated sheet shape and/or the second laminated sheet shape may be a custom shape based on the area of a structure requiring repair. The first pre-cured ply stack may comprise at least one first dimension and the second pre-cured ply stack may comprise at least one second dimension. For example, all pre-cured ply stacks may comprise a first laminated sheet thickness in the range of from about 17 mils to about 19 mils. The first laminated sheet thickness may be the same as or different than the second laminated sheet thickness. Multiple plies of composite material may be built up to form a desired thickness for each of the first pre-cured ply stack, the second pre-cured ply stack or both. In some applications only a single ply of composite material may be required for the first pre-cured ply stack, the second pre-cured ply stack or both, while in other applications, more than one ply may be necessary, depending on the application and the thickness requirements for reworking a composite structure.

In the case of a polygonal-shaped patch, for example, a square or rectangular patch, the first pre-cured ply stack may comprise a first sheet width and/or a first sheet length and the second pre-cured ply stack may comprise a second width and/or a second sheet length. The first sheet length may be the same as or different than the second sheet length. The first sheet width may be the same as or different than the second width. Accordingly, the second pre-cured ply stack may extend an entirety of the first pre-cured ply stack. As an example, a patch of an example may comprise a perimeter defined by the various layers thereof, for example, by a shape of the first pre-cured ply stack, the second pre-cured ply stack, the first film-adhesive and the second film-adhesive. The perimeter may extend a distance beyond the area requiring rework. For example, the perimeter may extend up to about at least 1 inch or greater, for example from up to about to 1 inch to about 5 inches, from up to about 1 inch to about 3 inches, including from up to about 1 inch to about 2 inches. In one particular example, the perimeter of the patch defined by a shape of film-adhesive layer(s) and pre-cured ply stack layer(s) forming patch. In an example, each consecutive one of film-adhesive layer or pre-cured ply stack sheet can extend beyond a previously placed layer or sheet by up to 0.5 inch or greater, for example from about 0.25 inch to about 1 inch, including from about 0.5 inch to about 0.75 inch. For example, the second film-adhesive can be defined by a perimeter that extends beyond a perimeter of the underlying first pre-cured ply stack, for example by at least 0.5 inch. In an example, the patch defined by the film-adhesive layer(s) and pre-cured ply stack sheet(s) formed one over the other extends about 1 inch beyond an area of a composite structure requiring rework. In one implementation, a perimeter of the first film-adhesive extends from up to about 1.0 inches or greater beyond the area of the composite structure requiring rework.

In the case of a round-shaped patch, for example, a circular patch, the first pre-cured ply stack may comprise a first sheet radius and the second pre-cured ply stack may comprise a second sheet radius. The first sheet radius may be the same as or different than the second sheet radius. Accordingly, the second pre-cured ply stack may extend an entirety of the first pre-cured ply stack and may be formed concentric with the second film-adhesive. As an example, a round-shaped patch of an example may comprise a radius defined by the various layers thereof, for example, by a shape of the first pre-cured ply stack, the second pre-cured ply stack, the first film-adhesive and the second film-adhesive. The radius may extend a distance beyond the area requiring rework. For example, the radius may extend up to about at least 1 inch or greater, for example from up to about to 1 inch to about 5 inches, from up to about 1 inch to about 3 inches, including from up to about 1 inch to about 2 inches. In one particular example, the perimeter of the patch defined by a shape of film-adhesive layer(s) and pre-cured ply stack layer(s) forming patch. In an example, each consecutive one of film-adhesive layer or pre-cured ply stack sheet can extend beyond a previously placed layer or sheet by up to 0.5 inch or greater, for example from about 0.25 inch to about 1 inch, including from about 0.5 inch to about 0.75 inch. For example, the second film-adhesive can be defined by a radius that extends beyond a perimeter of the underlying first pre-cured ply stack, for example by at least 0.5 inch. In an example, the patch defined by the film-adhesive layer(s) and pre-cured ply stack sheet(s) formed one over the other extends about 1 inch beyond an area of a composite structure requiring rework. In one implementation, a radius of the first film-adhesive extends from up to about 1.0 inches or greater beyond the area of the composite structure requiring rework.

The first pre-cured ply stack, the second pre-cured ply stack or both may conform to an underlying surface. Accordingly, the placing of the first pre-cured ply stack, the second pre-cured ply stack or both can comprise confirming of the respective ply stack to an underlying surface.

Figure 5A:
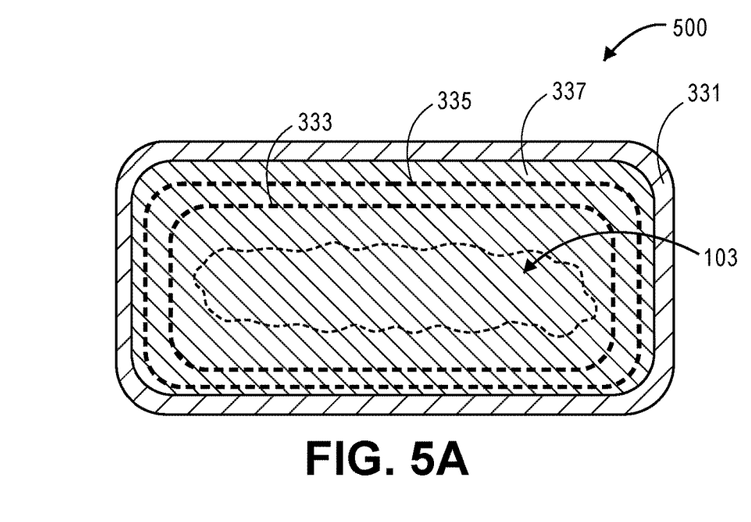
FIG. 5A is a top-view schematic a patch formed by reworking the structure according to an example, for example, as illustrated in FIGS. 3A-3E and FIGS. 4A-4E.

As shown in FIGS. 3A-3E and 4A-4E, an integrated composite patch may be formed over an area 103 defining a fault of composite structure 201' so as to rework the composite structure. A top view of the composite patch 500 according to an implementation is shown in FIG. 5A. Composite patch 500 may comprise a size and shape defined by one or more of the first film-adhesive, the first pre-cured ply stack, the second film-adhesive, the second pre-cured ply stack, or combinations thereof. For example, composite patch 500 may be configured as a radius cornered square or rectangle and may be placed over a fault area of a composite structure requiring rework. The area over which composite patch 500 may be placed may be a large area, such as an area having long and/or narrow damage (e.g., up to about 14 inches in length and/or and up to 4 inches in width) shown in FIG. 5A.

The patch 500 may include radius cornered square or rectangle ones of a first film-adhesive 331, a first pre-cured ply stack 333, a second film-adhesive 335, and a second pre-cured ply stack 337. The patch may be formed by combining, for example, individual ones of the first film-adhesive 331, the first pre-cured ply stack 333, the second film-adhesive 335 and/or the second pre-cured ply stack 337, which may be provided together in a repair kit such as kit 660 described below, into a single integrated multi-layered structure. The combining may be done prior to contacting one or more of the first film-adhesive 331, the first pre-cured ply stack 333, the second film-adhesive 335 and the second pre-cured ply stack 337 to a surface of the composite structure 201', for example as an integrated structure comprising one or more of 331, 333, 335 and 337, or they may be placed one or more at a time, for example, as individual/separate layers as illustrated in FIGS. 3A-3E and 4A-4E. The combining may include partially or fully curing, via light, heat and/or pressure, one or both of the first film-adhesive 331 and the second film-adhesive 335.

Figure 5B:
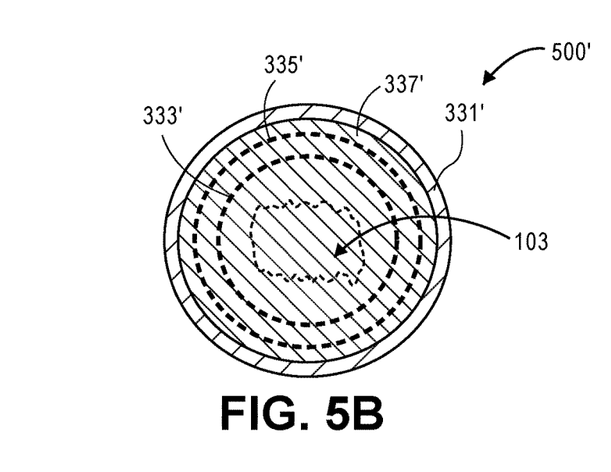
FIG. 5B is a top-view schematic of a patch formed by reworking the composite structure according to an example, for example, as illustrated in FIGS. 3A-3E and FIGS. 4A-4E.

A top view of the composite patch 500' according to an implementation is shown in FIG. 5B. Composite patch 500' may comprise a size and shape defined by one or more of the first film-adhesive, the first pre-cured ply stack, the second film-adhesive, the second pre-cured ply stack, or combinations thereof. For example, composite patch 500 may be configured as a plurality of circle-shaped laminate sheets aligned concentrically to one another, and may be placed over a fault area of a composite structure requiring rework. The area over which composite patch 500 may be placed may be a large area, such as an area having long and/or narrow damage (e.g., up to about 14 inches in length and/or and up to 4 inches in width) shown in FIG. 5A.

The patch 500' may include radius cornered square or rectangle ones of a first film-adhesive 331', a first pre-cured ply stack 333', a second film-adhesive 335', and a second pre-cured ply stack 337'. The patch may be formed by combining, for example, individual ones of the first film-adhesive 331', the first pre-cured ply stack 333', the second film-adhesive 335' and/or the second pre-cured ply stack 337', which may be provided together in a repair kit such as kit 660 described below, into a single integrated multi-layered structure. The combining may be done prior to contacting one or more of the first film-adhesive 331', the first pre-cured ply stack 333', the second film-adhesive 335' and the second pre-cured ply stack 337 to a surface of the composite structure 201', for example as an integrated laminated structure comprising one or more of 331', 333', 335' and 337', or they may be placed one or more at a time, for example, as individual/separate layers as illustrated in FIGS. 3A-3E and 4A-4E. The combining may include partially or fully curing, via light, heat and/or pressure, one or both of the first film-adhesive 331' and the second film-adhesive 335'.

A kit which includes the at least one film-adhesive and/or the at least one pre-cured ply stack may be provided, for example, for use in a method for placing over an area of a structure requiring repair such as in patch 500, 500' as described above. That is, in an implementation, a kit may contain a plurality of individual ones of a film-adhesive (i.e., individual first, second, third . . . $n^{th}$ film-adhesive layers) or a large film-adhesive layer that can be separated/cut into a one or more of the film-adhesive layers, and a plurality of individual ones of the pre-cured ply stack sheets (i.e., individual first, second, third . . . $n^{th}$ pre-cured ply stack sheets) or a large pre-cured ply stack layer that can be separated/cut into the plurality of individual ones of the pre-cured ply stack sheets.

Figure 6:
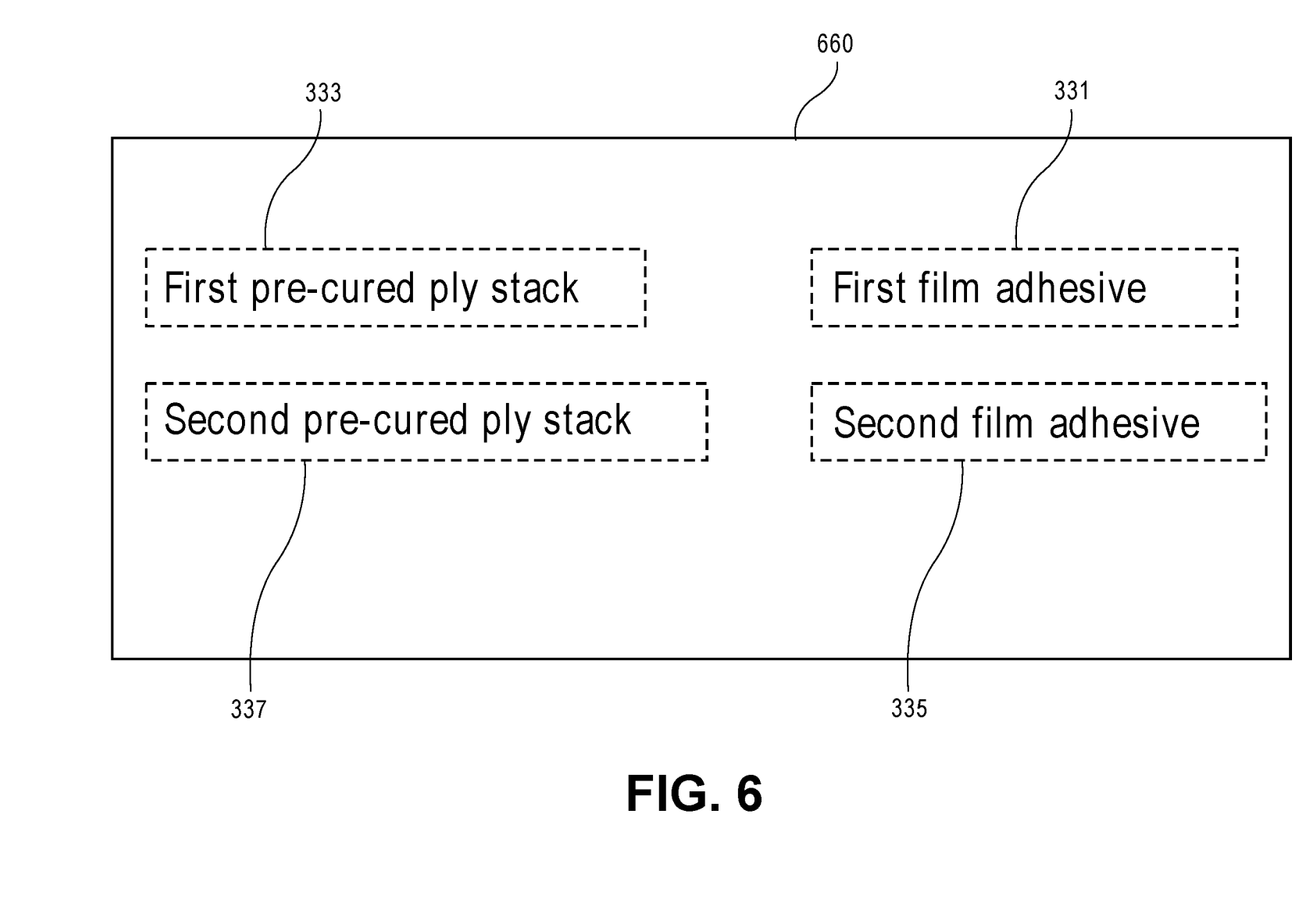
FIG. 6. is a block diagram of a patch kit according to an example.

For example, as shown in FIG. 6, a repair patch kit 660 comprises a first film-adhesive 331, a first pre-cured ply stack 333, a second film-adhesive 335 and a second pre-cured ply stack 337 may be provided in a kit 660. Individual ones of a first film-adhesive, a first pre-cured ply stack, a second film-adhesive and a second film-adhesive may be provided in the kit pre-sized such that their further manipulation into particular dimensions is unnecessary. Alternatively, one or more of the individual ones of the first film-adhesive, the first pre-cured ply stack, the second film-adhesive and the second pre-cured ply stack may be provided in the kit in generic sizes/shapes such that it/they require resizing prior to use or integration in a patch. That is, the first film-adhesive 331, first pre-cured ply stack 333, the second film-adhesive 335 and/or the second pre-cured ply stack 337 may be provided in the kit pre-sized, or, at a later time, may be trimmed to a predetermined size according to a size of the area 103 of the composite structure 201' requiring rework.

In an implementation, the first film-adhesive may have a first surface area defining a first size. In an implementation, the first pre-cured ply stack may have a second surface area defining a second size. In an implementation, the second film-adhesive may have a third surface area defining a third size. In an implementation, the second pre-cured ply stack may have a fourth surface area defining a fourth size. The first, second, third, fourth surface area or any combination thereof may be the same or different. The first, second, third, fourth size or any combination thereof may be the same or different.

In an implementation, the first film-adhesive may be defined by a first shape, the first pre-cured ply stack may be defined by a second shape comprising a second perimeter, and the second film-adhesive may be defined by a third shape comprising a third perimeter. The second perimeter may extend by up to, or greater than or equal to, about 0.5 inch, including from about 0.25 inch to about 1 inch, from about 0.5 inch to about 0.75 inch, beyond the first perimeter, for example, when the second film-adhesive is placed over the first pre-cured ply stack. In an implementation, the second pre-cured ply stack may be defined by a fourth shape comprising a fourth perimeter. The fourth perimeter may extend by greater than or equal to about 0.5 inch beyond the third perimeter, for example, when the second pre-cured ply stack is placed over the second film-adhesive.

Unlike conventional uncured ply stacks which require storage at low temperatures (e.g., require refrigeration until use), the pre-cured ply stacks as described herein are not limited by such storage requirements. Accordingly, the pre-cured ply stacks (e.g., first pre-cured ply stack, second pre-cured ply stack, or both) may be stored at elevated temperatures (e.g., do not require refrigeration until use). In an example, the at least one pre-cured ply stack of an example (e.g., the first pre-cured ply stack, the second pre-cured ply stack or both) may be stored at temperatures higher than their uncured versions, for example, uncured versions of the same compositions as the pre-cured ply stacks, including at about room temperature. Room temperature can include, but is not limited to about 25° C. depending on, for example, local ambient pressure, and may, therefore, fall within ranges of temperatures that include temperatures above and below about 25° C. Advantageously, therefore, a kit as described herein which includes at least one pre-cured ply stack is not necessarily limited by such storage requirements. Accordingly, in an implementation of a repair patch kit according to the examples disclosed herein, such as kit 660, the kit is storable at about room temperature.

While the examples have been illustrated respect to one or more implementations, alterations and/or modifications may be made to the illustrated examples without departing from the spirit and scope of the appended claims. In addition, while a particular feature of the examples may have been disclosed with respect to only one of several implementations, such feature may be combined with one or more other features of the other implementations as may be desired and advantageous for any given or particular function. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages may be added or existing structural components and/or processing stages may be removed or modified.

Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated example. Finally, "exemplary" indicates the description is used as an example, rather than implying that it is an ideal.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other examples will be apparent to those skilled in the art from consideration of the specification and practice of the descriptions disclosed herein. It is intended that the specification and examples be considered as exemplary only, with a true scope and spirit of the examples being indicated by the following claims.

What is claimed is:

1. A method for reworking an article, comprising:
   forming a patch over an area of a composite structure requiring rework, the forming comprising:
   placing a first film-adhesive over the area of the composite structure requiring rework, wherein the first film-adhesive extends over a first surface area of the composite structure including beyond an entirety of the area requiring rework,
   placing a first pre-cured ply stack over the first film-adhesive, wherein the first pre-cured ply stack extends over a second surface area of the composite structure;
   placing a second film-adhesive over the first pre-cured ply stack, wherein the second film-adhesive extends over a third surface area of the composite structure; and
   placing a second pre-cured ply stack over the second film-adhesive, wherein the second pre-cured ply stack extends over a fourth surface area of the composite structure,
   wherein the first surface area is larger than the second surface area.

2. The method of claim 1, wherein the first surface area is larger than the third surface area and wherein the first surface area is larger than the fourth surface area.

3. The method of claim 1, wherein the second surface area is larger than the area of a composite structure requiring rework.

4. The method of claim 1, wherein the third surface area is smaller than the second surface area.

5. The method of claim 1, further comprising curing the first film-adhesive, wherein the curing of the first film-adhesive bonds the first film-adhesive to the composite structure, bonds the first film-adhesive to the first pre-cured ply stack, or both.

6. The method of claim 1, further comprising curing the second film-adhesive, wherein the curing of the second film-adhesive bonds the second film-adhesive to the first pre-cured ply stack, bonds the second film-adhesive to the second pre-cured ply stack, or both.

7. The method of claim 1, wherein the area of the composite structure requiring rework comprises a damage of the structure that extends from an outer surface of the composite structure and penetrates through one or more plies of the structure.

8. The method of claim 1, wherein the area requiring rework comprises a deformation of the structure that extends into one or more plies of the composite structure, but which does not penetrate the plies.

9. The method of claim 1, wherein at least one of the first pre-cured ply stack or the second pre-cured ply stack comprises a carbon fiber reinforced polymer.

10. The method of claim 1, wherein at least one of the first pre-cured ply stack or the second pre-cured ply stack comprises a plurality of plies.

11. The method of claim 10, wherein both the first pre-cured ply stack and the second pre-cured ply stack comprise a plurality of plies, and wherein at least two of the plurality of plies of the first pre-cured ply stack, the second pre-cured ply stack, or both comprise different ply orientations.

12. The method of claim 10, wherein both the first pre-cured ply stack and the second pre-cured ply stack comprise a plurality of plies, and wherein a ply orientation of at least one of the plurality of plies of the first pre-cured ply stack is different than a ply orientation of at least one of the plurality of plies of the second pre-cured ply stack.

13. The method of claim 10, wherein both the first pre-cured ply stack and the second pre-cured ply stack comprise a plurality of plies, wherein at least one of the plurality of plies of the first pre-cured ply stack comprises a ply orientation of 0° or 90°, and wherein at least one of plurality of plies of the second pre-cured ply stack comprises a ply orientation of +45° or −45°.

14. A method for reworking an article comprising:
forming a patch over an area of a structure requiring rework wherein the patch comprises a stiffness substantially equal to a predetermined stiffness, the forming comprising:
alternating between placing at least one film-adhesive and placing at least one pre-cured ply stack over the area of the structure requiring rework, wherein a first one of the at least one film-adhesive extends over a first surface area of the structure and a first one of the at least one pre-cured ply stack extends over a second surface area of the structure that that is different than the first surface area; and
bonding the at least one film-adhesive to a surface of the structure,
wherein the first surface area is larger than the second surface area, and
wherein the second surface area is larger than the area of the structure requiring rework.

15. The method of claim 14, wherein the at least one pre-cured ply stack comprises a plurality of plies, and wherein at least one of the plurality of plies comprises a carbon fiber reinforced polymer.

* * * * *